(12) United States Patent
Virot et al.

(10) Patent No.: US 12,392,731 B2
(45) Date of Patent: Aug. 19, 2025

(54) METHOD FOR INSPECTING A MEDICAL CONTAINER

(71) Applicant: Becton Dickinson France, Le Pont de Claix (FR)

(72) Inventors: Thomas Virot, Herbeys (FR); Arnaud Grandvuillemin, Saint Nazaire les Eymes (FR)

(73) Assignee: Becton Dickinson France, Le Pont-de-Claix (FR)

( * ) Notice: Subject to any disclaimer, the term of this patent is extended or adjusted under 35 U.S.C. 154(b) by 237 days.

(21) Appl. No.: 17/927,180

(22) PCT Filed: May 28, 2021

(86) PCT No.: PCT/EP2021/064307
§ 371 (c)(1),
(2) Date: Nov. 22, 2022

(87) PCT Pub. No.: WO2021/239927
PCT Pub. Date: Dec. 2, 2021

(65) Prior Publication Data
US 2023/0349837 A1 Nov. 2, 2023

(30) Foreign Application Priority Data
May 29, 2020 (EP) .................................... 20305564

(51) Int. Cl.
*G01N 21/90* (2006.01)
*G02B 21/00* (2006.01)
(52) U.S. Cl.
CPC ......... *G01N 21/90* (2013.01); *G02B 21/0064* (2013.01)

(58) Field of Classification Search
CPC ............... G02B 21/0064; G01N 21/90; G01N 21/9018; G01N 2015/1445; G01N 15/1468
See application file for complete search history.

(56) References Cited

U.S. PATENT DOCUMENTS

2008/0230720 A1\* 9/2008 Nielsen .............. G01N 21/9027
250/492.1
2008/0297774 A1\* 12/2008 Jiang ...................... G01B 11/06
356/123

(Continued)

FOREIGN PATENT DOCUMENTS

| EP | 2503376 A1 | 9/2012 |
| JP | H1137952 A | 2/1999 |
| JP | 3194495 B2 | 7/2001 |

OTHER PUBLICATIONS

Gomez Zubicary "Method and Apparatus for the Control of Containers", Nov. 21, 2018, EP 3404357 A1 (Year: 2018).\*

(Continued)

*Primary Examiner* — Sang H Nguyen
(74) *Attorney, Agent, or Firm* — The Webb Law Firm

(57) ABSTRACT

A method for inspecting a medical container made of a light transmissive material. The method includes scanning a portion of the medical container to be inspected, by a white light emitted from a confocal chromatic system; detecting light reflected by the portion of the medical container by the confocal chromatic system; and determining whether a particle is present or not in or on the said portion of the medical container, based on a detection result obtained by the confocal chromatic system.

13 Claims, 6 Drawing Sheets

(56) References Cited

U.S. PATENT DOCUMENTS

| | | | | |
|---|---|---|---|---|
| 2008/0297795 A1* | 12/2008 | Yonggang | ............ | G01B 11/026 |
| | | | | 356/326 |
| 2012/0268741 A1* | 10/2012 | Pommereau | ........ | G01F 23/2921 |
| | | | | 356/343 |
| 2013/0057677 A1* | 3/2013 | Weil | .................... | G01N 21/9081 |
| | | | | 348/125 |
| 2013/0084598 A1 | 4/2013 | Moy et al. | | |
| 2018/0195974 A1* | 7/2018 | Kress | ..................... | H04N 7/181 |
| 2019/0056335 A1* | 2/2019 | Grandvuillemin | ........................... | |
| | | | | G01N 21/9027 |
| 2019/0195619 A1* | 6/2019 | Kress | ..................... | G01N 25/72 |

OTHER PUBLICATIONS

Ijuin et al "Inspection Device and Inspection Method for Hermetic Container", Jun. 4, 2015, JP 2015102360 A (Year: 2015).*

Kitagawa Katsuichi "Particle Coagulating Pattern Judging Device" Aug. 20, 1996, JPH08210970 A.*

Hillenbrand et al., "Parallelized chromatic confocal sensor systems", Optical Measurement Systems for Industrial Inspection VIII, 87880V, 2013, pp. 1-3, vol. 8788. (Relevant for reasons stated in the International Search Report and Written Opinion) (Abstract provided).

Michelt et al., "Contact-Free Thickness Measurement of Container Glass", Glas-Ingenieur, 2006, pp. 35-37, vol. 2.

* cited by examiner

METHOD FOR INSPECTING A MEDICAL CONTAINER

CROSS-REFERENCE TO RELATED APPLICATIONS

This application is the United States national phase of International Application No. PCT/EP2021/064307 filed May 28, 2021, and claims priority to European Patent Application No. 20305564.5 filed May 29, 2020, the disclosures of which are hereby incorporated by reference in their entirety.

FIELD OF THE DISCLOSURE

The present disclosure relates to a method for inspecting a medical container, in particular to a method for detecting the presence of particles in or on a portion of a medical container.

BACKGROUND OF RELATED ART

Medical containers must be as free of contaminants as possible. For example, if a small particle is present in or on an inner surface of the medical container defining an internal volume of the container, this particle may cause contamination of a medical product stored in the medical container, or cause injury to the user to whom the medical product is injected. Nonetheless, even if extreme care is taken, it is not always possible to prevent such particles from being formed during a manufacturing process of medical containers or a foreign particle from being attached to the medical container.

In order to avoid possible contamination due to presence of particles, visual inspection is carried out. Inspection with the naked eye, however, typically allows only a particle of 300 µm or larger to be identified. An optical or digital microscope may be optionally used in order to find small particles. However, microscopic inspection tends to require significant resources and thus is not suitable to a large scale of inspections. Further, in-depth assessment of a particle by a microscope may require extraction of a liquid from the container and subsequent observation of the particle on a filter. As such, it is a destructive inspection method and possible applicability is limited.

It may also be desirable to obtain geometric information of a particle in three dimensions (3D). Microscopic or camera inspection only allows for generation of particles information in two dimensions (2D).

Confocal chromatic technique is known as a non-destructive, non-contact sensing process for determining a thickness or surface roughness of a transparent object. It is also known to apply confocal chromatic technique in order to observe particles. For example, US 2013/0084598 discloses confocal chromatic imaging to generate a topographical representation of a surface of a culture medium where clusters of biological particles may be cultured. EP 2503376 describes an optical device for use in measurement of the size, quantity and/or presence or speed of particles in a fluid or gas or in a method for depth measurement.

Confocal chromatic sensing involves subjecting a white light to chromatic aberration (chromatic aberration along a light axis) through a diffractive lens, and directing the light to a measurement object through an object lens. The light reflected by the measurement object is directed to an optical pinhole, allowing only a light beam that has been focused on the object to go through. Due to the chromatic aberration, the focal positions of the light beams along the light axis are dependent on the wavelengths. Therefore, the distance to the measurement object can be determined by monitoring the wavelength of the reflected light.

SUMMARY OF THE DISCLOSURE

In view of the above-mentioned problems in inspecting a medical container, the objective of the present disclosure is to implement a method for inspecting a medical container.

According to the present disclosure, there are provided the method as defined in the appended claims.

Specifically, there is provided a method for inspecting a medical container made of a light transmissive material, the method comprising: scanning a portion of the medical container to be inspected, by a white light emitted from a confocal chromatic system; detecting light reflected by the portion of the medical container by the confocal chromatic system; and determining whether a particle is present or not in or on the said portion of the medical container, based on a detection result obtained by the confocal chromatic system.

The medical container may have a cylindrical shape, and the method may further comprise: during the scanning, rotating the medical container around a central axis of the medical container to perform inspection of the portion of the medical container at different positions along a circumference of the medical container.

The medical container may have a longitudinal shape, and the method may further comprise: during the scanning, moving the confocal chromatic system relative to the medical container to perform inspection of the portion of the medical container at different positions along a longitudinal direction of the medical container.

The confocal chromatic system used in the method of the disclosure may comprise a 2D sensor, and the scanning and the detecting is carried out by the 2D sensor, and the method may further comprise: generating a 2D image of the portion of the medical container indicating presence or absence of the particle, wherein the determining is carried out based on the 2D image.

If it is determined that at least one particle is present, the method may further comprise: counting the number of particles on the 2D image.

The confocal chromatic system used in the method of the disclosure may further comprise a 3D sensor, and if it is determined that at least one particle is present, the method may further comprise: scanning the portion of the medical container including the particle by a white light emitted from the 3D sensor of the confocal chromatic system; detecting light reflected by the portion of the medical container by the confocal chromatic system; and obtaining 3D geometric information of the portion of the medical container including the particle, based on a detection result obtained by the confocal chromatic system.

The method may further comprise: generating a 3D image of the portion of the medical container including the geometric information of the particle.

In the method of the disclosure, the scanning may be carried out by the light substantially orthogonal to the portion of the medical container.

Said method may be implemented using a system comprising a confocal chromatic system configured to determine whether or not a particle is present in or on a portion of the medical container.

The system may further comprise: a holder configured to rotatably hold the medical container; and a rotary actuator configured to rotate the medical container on the holder.

The system may further comprise a linear actuator configured to move the confocal chromatic system relative to the holder.

The confocal chromatic system may comprise a 2D sensor and may be configured to generate a 2D image of the portion of the medical container and determine on the 2D image at least one of the followings: the number of particles; the location of each particle; and the dimensions of each particle.

The confocal chromatic system may comprise a 3D sensor and may be configured to obtain 3D geometric information of the portion of the medical container including the particle.

The confocal chromatic system may be configured to generate a 3D image of the portion of the medical container including the particle.

By virtue of the method of the disclosure, any particle present in and/or on a portion of the medical container may be detected, counted and/or measured reliably and efficiently. When thorough inspection is required involving measurement of any particle found, the disclosure can also provide time-efficient geometric measurement of a particle in three dimensions.

BRIEF DESCRIPTION OF THE DRAWINGS

Embodiments of the disclosure will be described in further detail with reference to the accompanying drawings, in which.

DETAILED DESCRIPTION OF THE DISCLOSURE

The present disclosure uses confocal chromatic technique in order to detect, count and/or measure a particle that may be present in and/or on a portion of a medical container.

As of today, confocal chromatic technique is widely known by the skilled person and mainly used for measurement of a distance to an object, a thickness of an object and/or surface roughness of an object. No case has been reported to apply the technique in order to detect potential presence of a particle in and/or on a portion of a medical container. Particles that can be detected according to the disclosure are not limited to, but include glass, plastic or cotton particles, or foreign particles such as medical product agglomerates. Said particles may be formed during the manufacturing process of said medical container; the foreign particles may be attached to the medical container further said manufacturing process.

Figure 1:
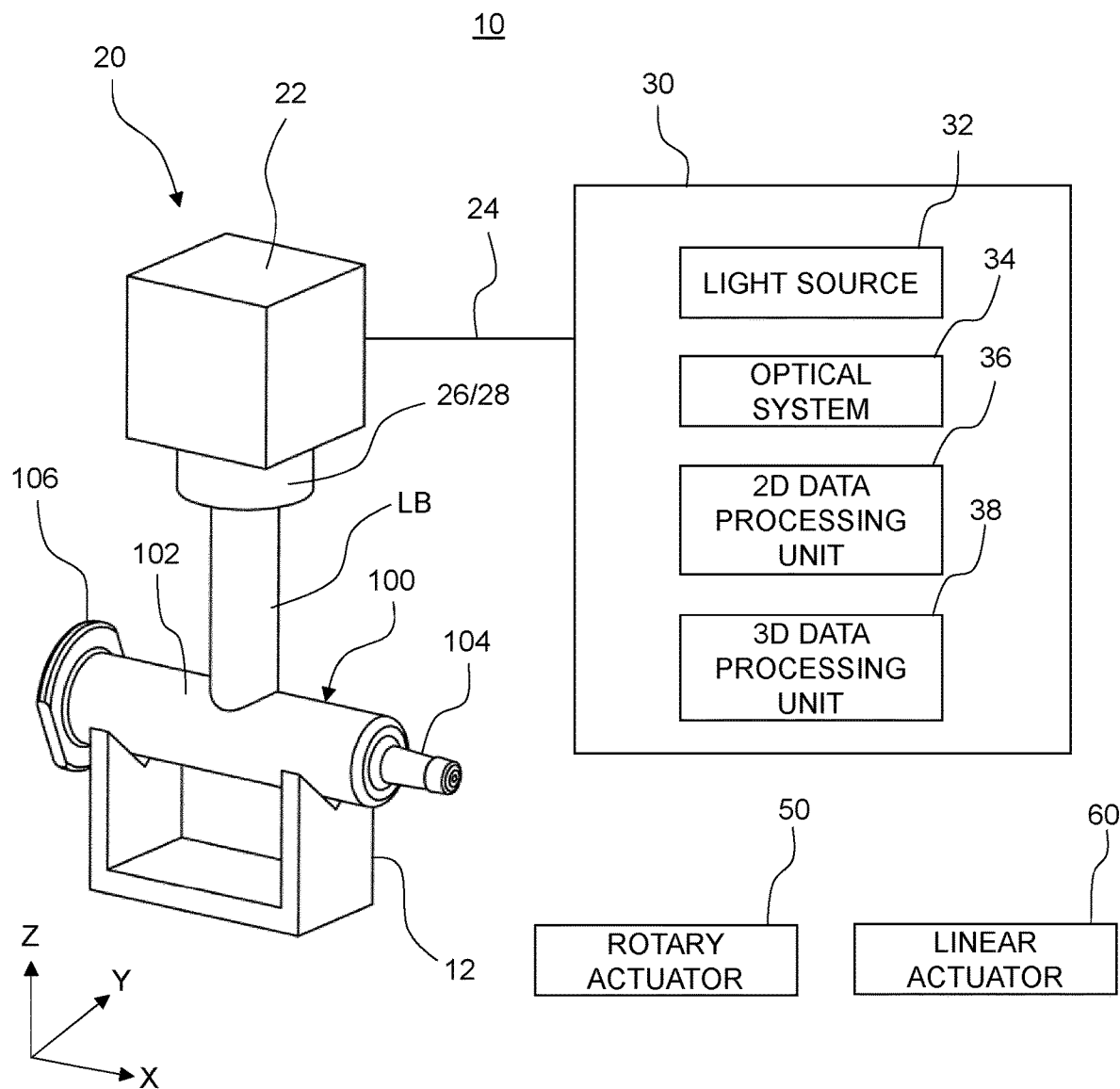
FIG. 1 schematically illustrates an inspection system according to an embodiment.

FIG. 1 schematically illustrates an inspection system 10 according to an embodiment. In the illustrated embodiment, the inspection system 10 is used to perform inspection of medical container such as a syringe 100 made of glass.

The syringe 100 generally has a longitudinal shape extending along its longitudinal axis that may define X-axis. The syringe 100 includes a hollow cylindrical barrel 102 extending along the longitudinal axis, a tip portion 104, to which a needle may be attached, and a flange portion 106 for holding the syringe 100 at the time of injection. The barrel 102 defines an internal cavity within which a plunger (not shown) can be pushed toward or pulled away from the tip portion 104 in order to perform injection.

The glass syringe 100 is herein indicated as an object to be inspected, by way of example. However, any other medical containers may also be inspected according to the disclosure in a similar manner as long as those containers are made of a light transmissive material or a non-opaque material, irrespective of their size, shape and usage. The material may be transparent or translucent, preferably glass but may also be plastic.

As shown in FIG. 1, the inspection system 10 includes a confocal chromatic system 20 for performing inspection of the syringe 100 and a holder 12 for rotatably and translationally holding the syringe 100 during the inspection.

The syringe 100 may be rotated on the holder 12 around the central axis of the barrel 102 by a rotary actuator 50. The rotary actuator 50 may be any known rotary actuator. The holder 12 may also be configured to be movable along the X-axis together with the syringe 100.

The confocal chromatic system 20 includes a sensor head 22 and a control device 30 connected to each other via an optical cable 24.

The optical cable 24 may include optical fiber bundles. The control device 30 further includes a light source 32 and an optical system 34, a two-dimensional (2D) data processing unit 36 and, optionally, a three-dimensional (3D) data processing unit 38.

Although not illustrated, the control device 30 includes a computer configured to perform data processing that is required for inspection of the syringe 100. The control device 30 thus includes a processor for executing various calculations, random access memory (RAM) for temporarily storing information or data that is obtained by sensing devices or calculations, read only memory (ROM) for storing operating software, and non-volatile memory for storing parameters, reference tables, program for controlling operation of the sensor head 22 for scanning an intended area of the syringe 100 and program necessary to carry out image processing for detecting, counting and/or measuring particles based on the obtained information, etc.

The light source 32 may be any known lighting device configured to emit a light, such as a polychromatic light or a white light, preferably a white light. The optical system 34 may include optical devices for transmitting the light emitted by the light source 32 to the sensor head 22 through the optical cable 24. The optical system 34 may also include optical devices for transmitting light received by the sensor head 22 to the 2D data processing unit 36 and to the 3D data processing unit 38.

The sensor head 22 comprises a 2D sensor 26 and a 3D sensor 28. The 2D sensor 26 and the 3D sensor 28 may be provided in the same sensor head 22. For the sake of better legibility, only one of the 2D sensor 26 and the 3D sensor 28 is illustrated in FIG. 1. Alternatively, the 2D sensor 26 and the 3D sensor 28 may as well be provided in separate, dedicated sensor heads.

The 2D sensor 26 is configured to scan a portion of the syringe 100 to be inspected with a white light; and receive light reflected by said portion of the syringe 100. The reflected light is then transmitted to the 2D data processing unit 36. The 3D sensor 28 is configured to scan the portion of the syringe 100 where the particle is detected based on the 2D data processing and receive light reflected by said portion of the syringe 100. The reflected light is then transmitted to the 3D data processing unit 38.

Each of the 2D sensor 26 and the 3D sensor 28 may include optical lenses (not shown), such as a diffractive lens for subjecting the white light from the light source 32 to chromatic aberration. The sensor head 22 may also include an object lens (not show) for directing a light beam LB emitted from the sensor head 22 to the measurement object.

Figure 2:
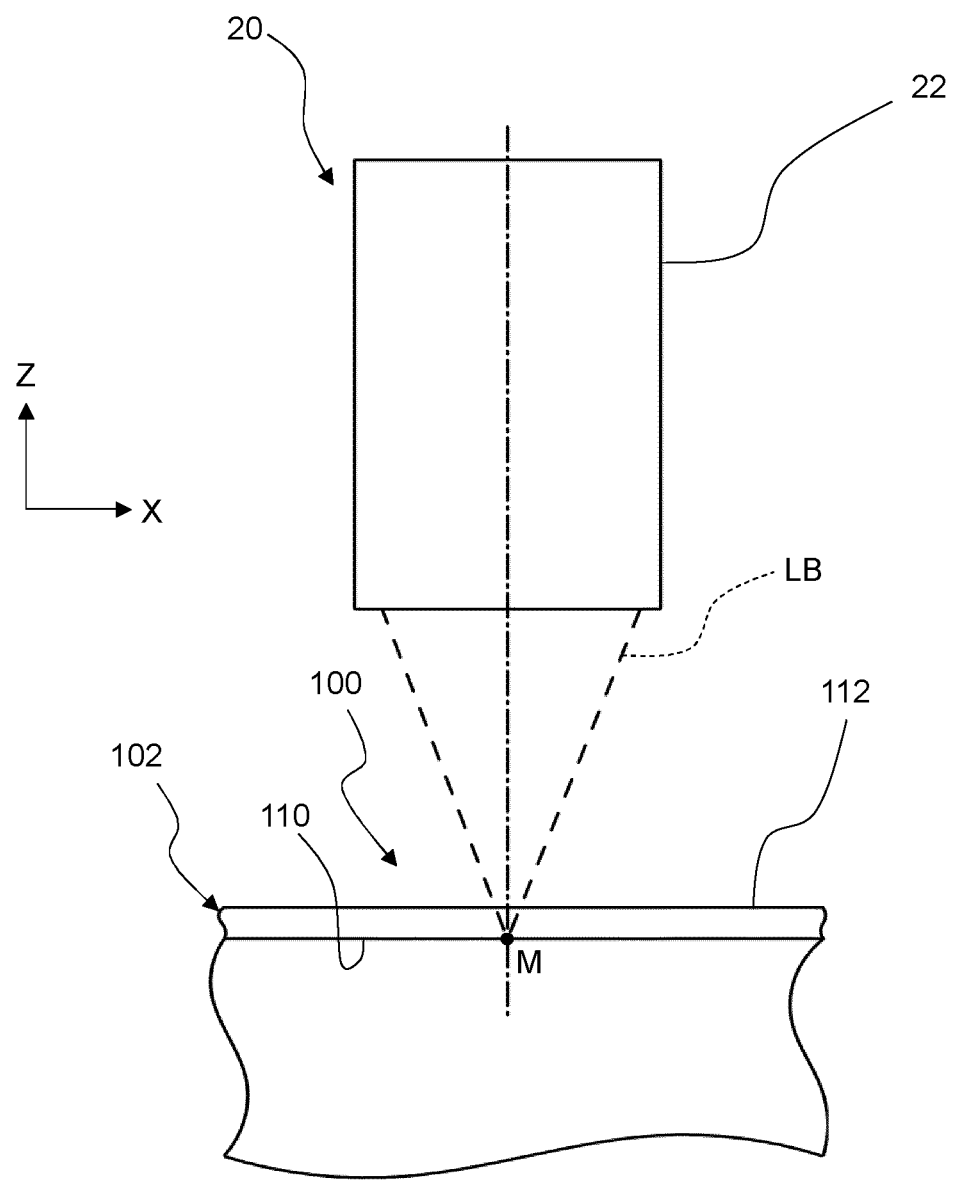
FIG. 2 illustrates a confocal chromatic system in use for inspection of a medical container according to the embodiment.

According to the disclosure, the light beam LB is directed to a portion of the syringe 100 to be scanned for inspection. In one embodiment, the inner surface 110 of the syringe 100 may be scanned for inspection, as shown in FIG. 2. In another embodiment, the outer surface 112 of the syringe 100 may also be scanned for inspection. In yet another embodiment, any point in the syringe 100 extending between the outer surface 112 and the inner surface 110 may also be scanned.

Due to the chromatic aberration, the light beam LB has different focal positions along its light axis that may be defined in Z-axis, depending on the respective wavelengths. In FIG. 2, only the light beam LB that has a focus on the measurement point M on the inner surface 110 of the syringe 100 is illustrated for the sake of better legibility. By virtue of the confocal configuration, only the light beam LB reflected by the measurement point M on the inner surface 110 can be collected and transmitted into the optical cable 24 and then to the optical system 34 of the control device 30. The other light beams that do not have a focal point on the measurement point M of the inner surface 110 of the syringe 100 are not collected by the sensor head 22.

Referring again to FIG. 1, the sensor head 22 may be configured to move along the barrel 102 of the syringe 100, i.e. along the X-axis. A linear actuator 60 may be used to allow the sensor head 22 to travel along an entire length of the barrel 102. With this configuration, it is ensured that the inspection can be performed over the entire length of the barrel 102. Alternatively or additionally, the holder 12 may be configured to be movable with the syringe 100 relative to the sensor head 22 to enable the inspection over the entire length of the barrel 102. Additionally, the rotary actuator 50 enables to move the syringe 100 relative to the sensor head 22 to enable the inspection over the entire circumference of the barrel 102.

Figure 3:
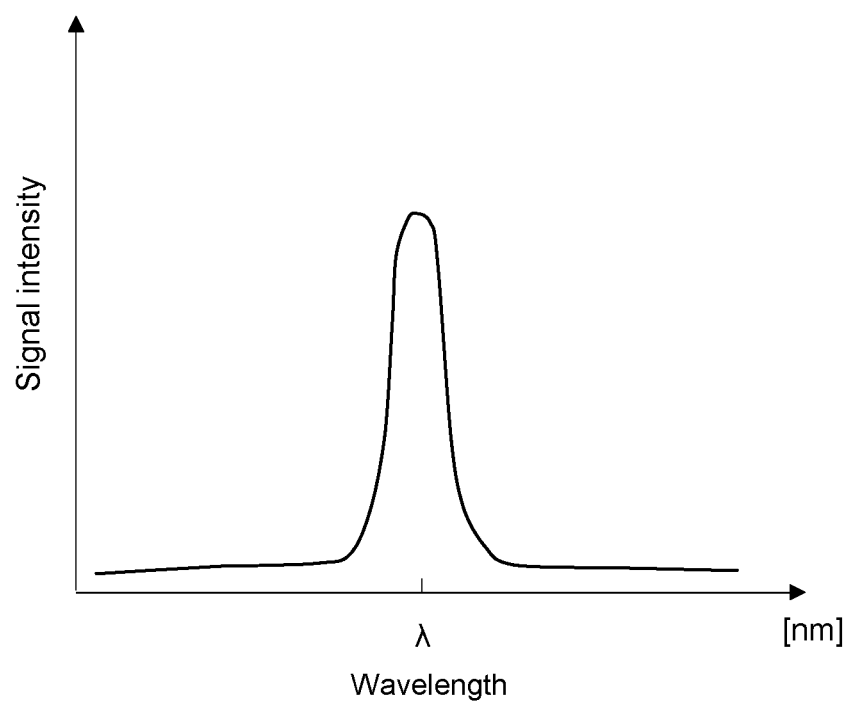
FIG. 3 illustrates signal intensities with respect to wavelengths of light detected by the confocal chromatic system.

FIG. 3 illustrates signal intensities with respect to wavelengths of light detected by the confocal chromatic system 20. The signal intensity has a peak value with respect to the wavelength A. The light beam of the wavelength of A has a focal point on the inner surface 110 of the syringe 100 or on the measurement point M in FIG. 2. The relationship between a particular wavelength and a focal position that corresponds to a distance to the measurement object can be determined in advance. Based on the predefined relationship, it is possible to determine the distance to the measuring point M on the inner surface 110 of the syringe 100 by monitoring the wavelength of the reflected light showing the highest signal intensity.

The 2D data processing unit 36 is configured to obtain measurement results based on the light reflected by the measurement object through the 2D sensor 26 to generate a 2D image of the measurement object. The 2D image may be used to calculate the dimensions of the particle on the 2D image, e.g. the length or width of the particle. The length herein refers to the dimension of the particle along its longitudinal direction on the 2D image, e.g. the dimension of the particle along the X-axis. The width herein refers to the dimension of the particle along a direction perpendicular to the longitudinal direction on the 2D image, e.g. the dimension of the particle along the Y-axis. The 2D image lacks information on the height (or thickness) of the particle. The height may be defined in a direction perpendicular to the directions in which the length and the width are defined. The height may also be defined as the dimension of the particle along the Z-axis.

Figure 4:
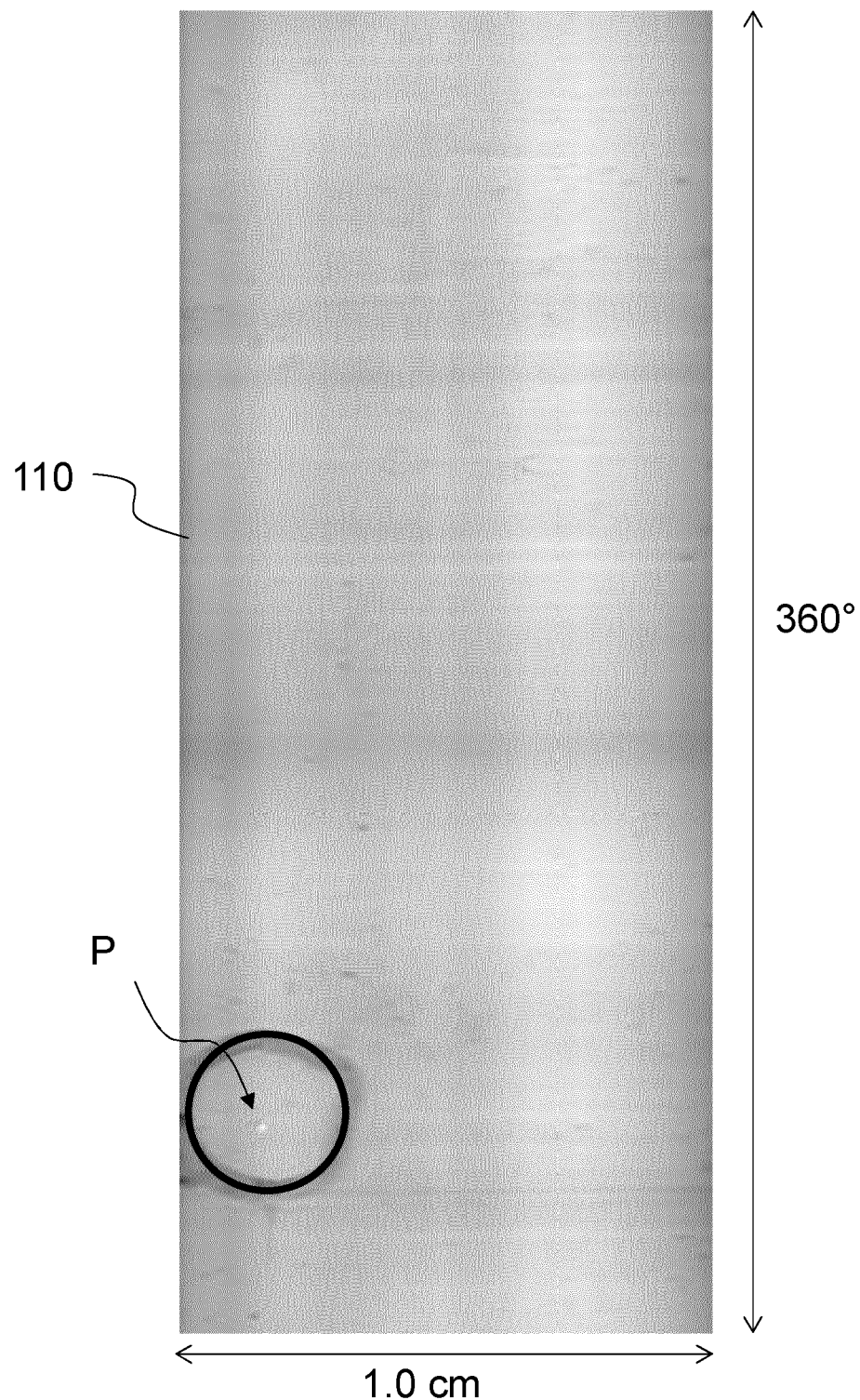
FIG. 4 is a 2D image generated by the confocal chromatic system indicating the presence of a particle.

FIG. 4 is a 2D image generated by the confocal chromatic system 20 based on data acquired by the 2D sensor 26 and the 2D data processing unit 36 according to the embodiment. The 2D image of FIG. 4 represents the inner surface 110 of the syringe 100 over the entire circumference (i.e. 360° around the center) of the syringe 100 and over the distance of 1.0 cm along the longitudinal direction (X-axis) of the syringe 100. As illustrated, the 2D image indicates the presence of a particle P on the inner surface 110 as highlighted by the circle and the arrow in FIG. 4.

Figure 5:
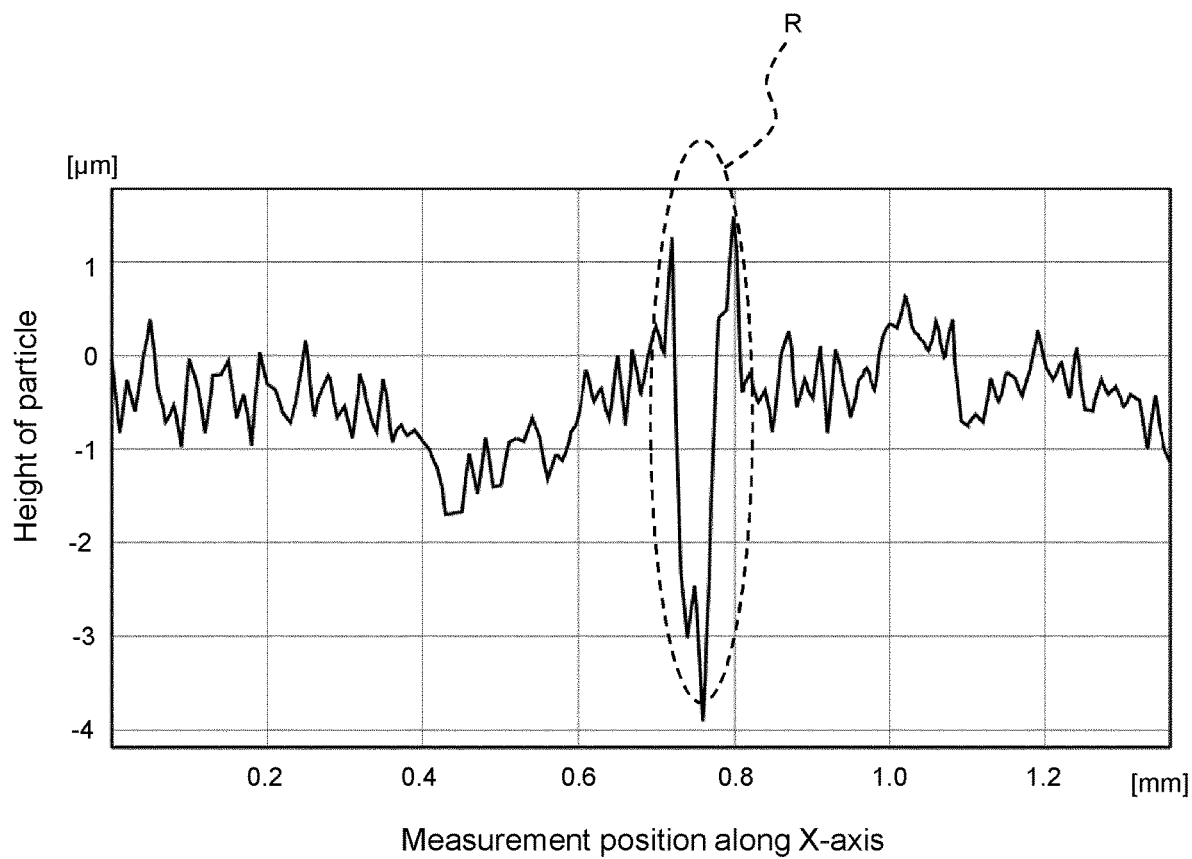
FIG. 5 shows a measurement result indicating the height of the detected particle.

The 3D data processing unit 38 is configured to obtain measurement results based on the light reflected by the measurement object through the 3D sensor 28 to obtain a 3D geometric information of the measurement object, i.e. the width, length and the height of the particle. FIG. 5 shows a measurement result indicating the height of the detected particle. The highlighted region R in FIG. 5 indicates the location and the height of the detected particle.

Hereafter, the inspection method using the inspection system 10 will be explained.

A medical container to be inspected according to the disclosure may be emptied of any fluid (liquid and/or gas) before the inspection starts. Alternatively, the inspection may be performed with the medical container filled with a medical product.

The confocal chromatic system 20 may be configured in advance so as to direct the light beam LB emitted by the sensor head 22 to focus on a portion of the medical container where inspection is needed. For example, the confocal chromatic system 20 may be configured to direct the light beam LB to focus on the inner surface of the medical container, e.g. the inner surface 110 of the syringe 100 as shown in FIG. 2. The inner surface of the medical container defines an internal cavity and is typically the part where the presence of particles has to be avoided and therefore inspection is needed. For the illustrative purpose, the inspection on the inner surface 110 of the syringe 100 will be described below.

Firstly, the detection of particle is performed by obtaining the 2D image of the whole inner surface 110 of the syringe 100 using the 2D sensor 26. The confocal chromatic system 20 is controlled to scan the inner surface 110 of the syringe 100 with the light beam LB emitted from the 2D sensor 26. The sensor head 22 is disposed in place relative to the syringe 100 in such a way that a white light is emitted from the 2D sensor 26 substantially orthogonally to the inner surface 110 of the syringe 100. In order to scan an entire circumference of the syringe 100, the scanning is carried out while the syringe 100 is rotated by the rotary actuator 50. The rotational speed is adjusted depending on the processing speed of the confocal chromatic system 20. It is to be noted that at this stage, only the 2D information is obtained, namely the length and the width of the particles are measured, without measuring the height of the particle if any particle is detected. Therefore, the processing speed is significantly fast.

While the scanning is processing around the circumference of the syringe 100, the sensor head 22 or the holder 12 is moved along the longitudinal axis of the syringe 100, i.e. the X-axis, to continue scanning until the entire length of the barrel 102 is scanned by the confocal chromatic system 20.

After completion of the scanning, the 2D data processing unit 36 generates the 2D image from data acquired by the 2D sensor 26 as shown in FIG. 4, in which the particle P appears as a result of interference caused to the signal detection by the 2D sensor 26.

The 2D data processing unit 36 processes the 2D image in order to detect any particle that appears to be present on the image. As a result of the image processing, the dimensions (e.g. length and width) and the location of the particle P on the 2D image can be identified. The 2D processing unit 36 may also obtain the number of particles on the 2D image.

Therefore, by assessing the 2D image generated from data acquired by the 2D sensor 26 of the confocal chromatic system 20, it can be determined whether or not any particle is present in or on the inner surface 110 of the syringe 100.

Next, the height measurement of the particle detected by the previous step may be carried out. Since the location of each particle is now known, the confocal chromatic system 20 scans only the portion(s) of the inner surface 110 of the syringe 100 that include(s) the particle detected in the previous detection process.

Figure 6:
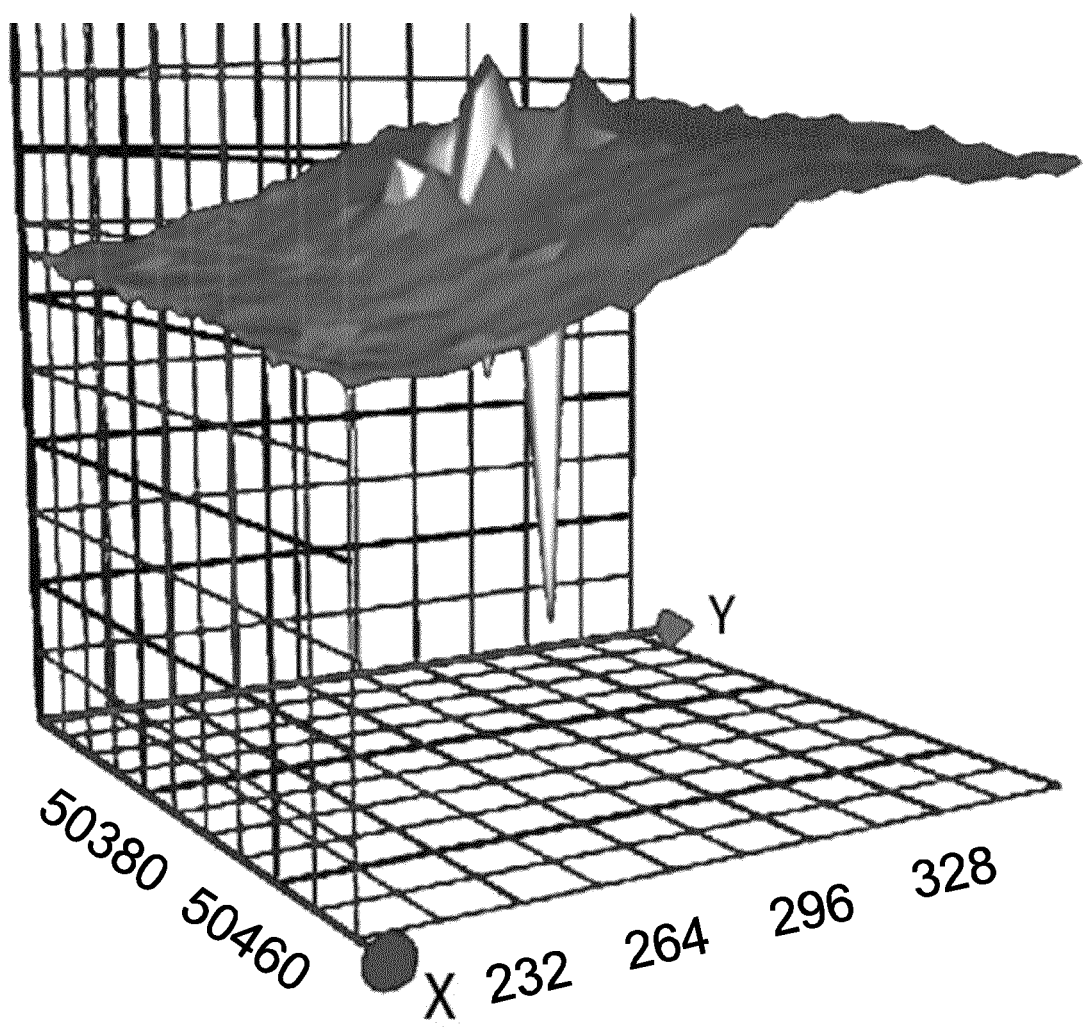
FIG. 6 is 3D graphics representing geometric information of the inner surface of the medical container including the detected particle.

In this second step the 3D measurement is performed by the 3D sensor 28 and the 3D data processing unit 38. Therefore, the full profile of the detected particles can be identified, including the height. Based on the result of the 3D measurement, 3D graphics representing geometric information of the portion near the particle may be generated, for example, as shown in FIG. 6.

Through the inspection process explained above, the following information may be obtained: the number of particles found in the medical container; the location of each particle; and the 3D profile of each particle. The control device 30 may also generate the list of particles identified that is classified by size or by other geometric information.

The inspection process according to the disclosure allows for quick detection of particles of 10 μm or larger, including the locations of the particles. The subsequent 3D measurement is only carried out for a portion where the particle has been detected. Consequently, the entire operation may be complete for a substantially shorter period of time, e.g., less than 5 minutes. Depending on the length and diameter of the syringe to be inspected, the required time can be even shorter. The inspection system also allows for thorough inspection in a non-destructive manner. Confocal chromatic systems are widely available in the market, and thus it is easy to implement the disclosure.

The embodiments disclosed herein are presented merely for the illustrative purpose and are not limiting the scope of the disclosure, which is defined by the appended claims.

The invention claimed is:

1. A method for inspecting a medical container made of a light transmissive material and having a longitudinal shape, the method comprising:
   scanning a portion of the medical container to be inspected, by a white light emitted from a confocal chromatic system;
   during the scanning, moving the confocal chromatic system linearly in a longitudinal direction relative to the medical container to perform inspection of the portion of the medical container at different positions along a longitudinal direction of the medical container;
   detecting light reflected by the portion of the medical container by the confocal chromatic system; and
   determining, with the confocal chromatic system, whether a foreign particle is present or not in or on the said portion of the medical container, based on a detection result obtained by the confocal chromatic system.

2. The method according to claim 1, wherein
   the medical container has a cylindrical shape,
   the method further comprising:
   during the scanning, rotating the medical container around a central axis of the medical container to perform inspection of the portion of the medical container at different positions along a circumference of the medical container.

3. The method according to claim 1, wherein the confocal chromatic system comprises a 2D sensor, and the scanning and the detecting are carried out by the 2D sensor, the method further comprising:
   generating a 2D image of the portion of the medical container indicating presence or absence of the foreign particle, wherein
   the determining is carried out based on the 2D image.

4. The method according to claim 3, wherein
   if it is determined that at least one foreign particle is present, the method further comprises:
   counting the number of foreign particles on the 2D image.

5. The method according to claim 3, wherein
   if it is determined that at least one foreign particle is present, the method further comprises:
   measuring the dimensions of each foreign particle and/or the location of each particle detected on the 2D image.

6. The method according to claim 3, wherein
   the confocal chromatic system further comprises a 3D sensor, and wherein
   if it is determined that at least one foreign particle is present, the method further comprises:
   scanning the portion of the medical container including the foreign particle by a white light emitted from the 3D sensor of the confocal chromatic system;
   detecting light reflected by the portion of the medical container (100) by the confocal chromatic system; and
   obtaining 3D geometric information of the portion of the medical container including the foreign particle, based on a detection result obtained by the confocal chromatic system.

7. The method according to claim 6, further comprising:
   generating a 3D image of the portion of the medical container including the geometric information of the foreign particle.

8. The method according to claim 1, wherein
   the scanning is carried out by the light substantially orthogonal to the portion of the medical container.

9. The method according to claim 1, wherein
   the foreign particle is an unintentional biproduct formed during a manufacturing process of the medical container.

10. The method according to claim 1, wherein
    the foreign particle is a medical product agglomerate.

11. The method according to claim 1, wherein
    the portion of the medical container is an inner surface defining an internal volume.

12. The method according to claim 1, wherein
    the portion of the medical container is an outer surface exposed to an outside environment.

13. The method according to claim 1, wherein
the portion of the medical container is any point between an inner surface defining an internal volume and an outer surface exposed to an outside environment.

\* \* \* \* \*